March 19, 1940.  H. H. HAGLUND  2,193,902
OCEAN CABLE CARRIER SYSTEM
Filed July 9, 1937
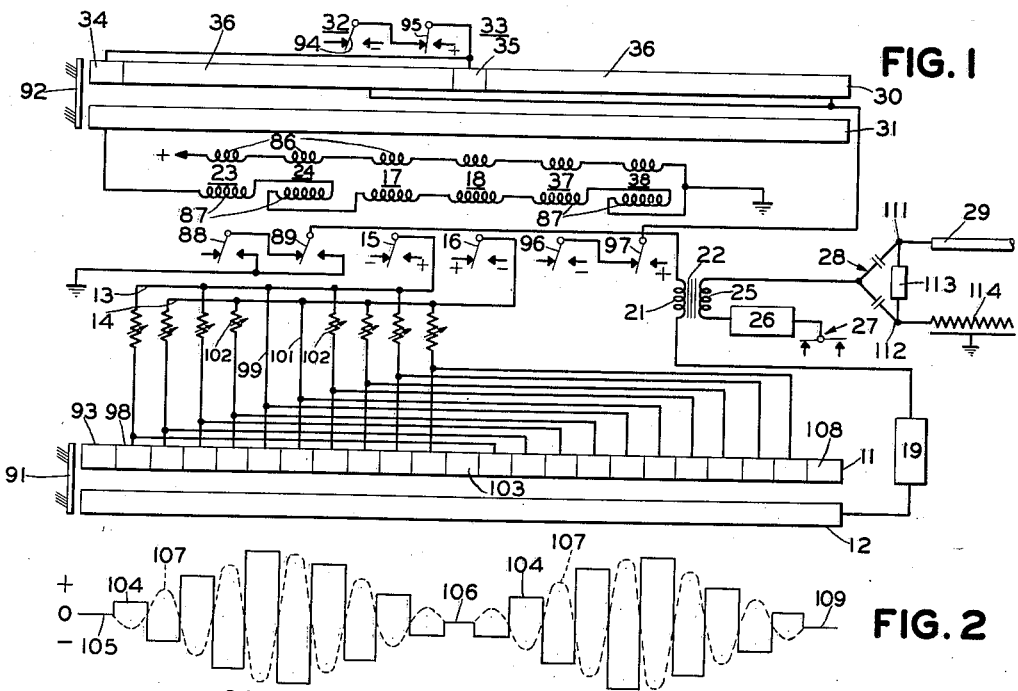
FIG. 1
FIG. 2
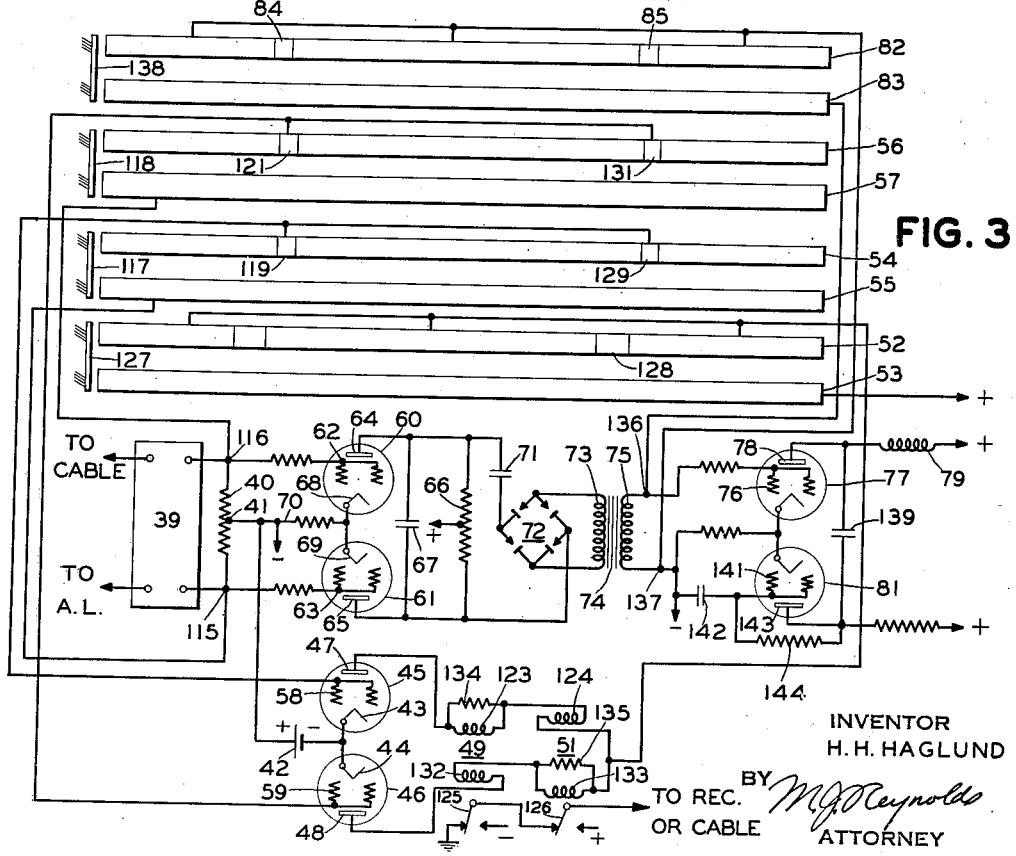
FIG. 3
INVENTOR
H. H. HAGLUND
BY M.J. Reynolds
ATTORNEY

Patented Mar. 19, 1940

2,193,902

UNITED STATES PATENT OFFICE 2,193,902

OCEAN CABLE CARRIER SYSTEM

Hakon H. Haglund, New York, N. Y., assignor to The Western Union Telegraph Company, New York, N. Y., a corporation of New York Application July 9, 1937, Serial No. 152,697

16 Claims. (Cl. 178—66)

This invention relates to signalling systems in general and has particular reference to carrier frequency signalling applied to submarine cables.

It is often desirable to increase the capacity of an ocean cable by superimposing upon the physical circuit one or more additional signalling channels comprising carrier current frequencies. However, to modulate the usual carrier frequency in accordance with the three element cable code involves the use of line signals varying in amplitude according to the code elements which they represent. The recording of the received signals requires, in addition to the usual filter and amplifier, a rectifier and recording equipment, the latter of which must be marginal in its operation. Such a system is susceptible to extraneous influences and as a result is critical and unreliable in its operation. Also, the apparatus necessary to insure reasonably satisfactory operation becomes too complicated to be practical.

The present invention is concerned with a simple generator of a carrier frequency which is premodulated according to the signals to be transmitted and also with a receiving device which is responsive to predetermined cycles of the carrier frequency and which is positive in its response, being independent of signal amplitude.

One object of the invention is to provide a generator of carrier frequency which is capable of producing a series of cycles of alternating current, each cycle having a predetermined amplitude.

Another object of this invention is to produce succeeding series of alternating current cycles in which corresponding cycles of different series invariably have the same amplitudes but may be reversed in polarity according to the signals to be transmitted.

Still another object is to provide an alternating current generator in the form of a rotating distributor.

A further object of the invention is to provide a receiving system which is synchronous with the transmitting apparatus.

A still further object is to provide a translating device for the operating of a recorder which is responsive to predetermined portions of the received alternating current signals.

Another object of the present invention is to provide corrective means for maintaining synchronism between the transmitting and receiving apparatus.

Still another object of the invention is to provide means for superimposing one or more carrier frequencies upon a cable having a physical circuit which may be operated simultaneously in any well known manner.

These and other more specific objects are effected by the present invention in a manner which will become apparent from the following description taken in conjunction with the accompanying drawing of which:

Fig. 1 is a diagrammatic representation of the essential transmitting station apparatus;

Fig. 2 illustrates typical carrier frequency signals; and

Fig. 3 shows diagrammatically the receiving station equipment.

The essential attributes of the present invention are (1) the generation of an alternating current frequency which may be shifted in phase one hundred and eighty electrical degrees according to the code signal to be transmitted so that, at any given time after the initiation of a series of alternating current cycles, the polarity of the line signal is indicative of the code signal; and (2) the response by suitable receiving apparatus, operating in timed relation with the transmitting apparatus, to only the indicative portion of the alternating current line signal occurring at the given time. Synchronism between the sending and receiving ends of the system is maintained by utilizing the line signals in a manner which will be described in detail hereinafter.

Having reference first to Fig. 1, there is shown an alternating current generator in the form of a pair of distributor rings 11 and 12. One ring 11 is segmented, having alternate segments connected to one or the other of two bus bars 13 and 14. Positive potential is applied to one bus bar and negative potential to the other or vice versa depending upon the positions of the tongues 15 and 16 of the control relays 17 and 18 respectively. The solid ring 12 of this pair of rings is connected through a sending filter 19 and the primary winding 21 of a transformer 22 to the contacts of the control relays 23 and 24 whence, if either of these relays is operated with its tongue to the right, it is connected to neutral battery or ground; otherwise this circuit is open. The secondary winding 25 of the transformer 22, with another filter 26 and a transmitter 27 for direct current signalling included in its circuit, is connected to the apex of a duplex bridge 28 and thence to the cable 29. As a part of the same distributor, or otherwise operable in timed relation therewith, is a pair of local rings 30 and 31. Connected to the contacts of the code relays 32 and 33 are short operating segments 34 and 35, the remainder of that ring comprising relatively longer locking segments 36 which are connected to the contacts of the locking relays 37 and 38.

The apparatus comprising the receiving or repeating station is shown in Fig. 3. The input circuit of any well known signal shaping and amplifying device 39 is connected to the receiving circuit of the duplex bridge in which the cable is terminated. An output resistance 40 is shunted across the output circuit of the device 39, and the midpoint 41 of the resistance is connected to the positive pole of a biasing battery 42. The negative pole of the battery is connected to the cathodes 43 and 44 of the receiving tubes 45 and 46 respectively. Both of these tubes are of the gaseous conduction type and have their anodes 47 and 48 connected through windings of the repeating relays 49 and 51 to the segmented ring 52 of the receiving distributor. The solid ring 53 associated with ring 52 is connected to positive potential, thereby periodically supplying the anode potential for the tubes 45 and 46. Two other pairs of distributor rings 54, 55 and 56, 57 periodically connect the control grids 58 and 59 of the tubes 45 and 46 with the output resistance 40. The apparatus described is that which is utilized in the reception and repetition of the code signals.

It is essential that the transmitting and receiving distributors revolve in synchronism and it is common practice in systems embodying synchronous distributors to normally operate one at a slightly higher speed than the other. Then, by means of corrective impulses, usually derived from the line signals, the brushes of the speedier distributor are set back intermittently whereby the desired phase relationship between sending and receiving distributors is maintained. In the present system, the receiving distributor is operated at the higher speed and hence, correction must be effected at the receiving station. However, such a system may be operated duplex, in which case the transmitting distributor may also embody receiving rings and the receiving distributor sending rings. But in any event, phase correction is accomplished by apparatus forming part of the receiving equipment associated with the speedier distributor.

To attain this end, two gas discharge tubes 60 and 61 are provided, having their control grids 62 and 63 respectively connected to the terminals of the output resistance 40. These tubes are connected in the well known inverter fashion with their anodes 64 and 65 connected to a load resistance 66 and shunted by a commutating capacitor 67, and with their cathodes 68 and 69 connected to a common return 70. Also shunting the resistance 66 is a series circuit comprising a condenser 71, a full wave rectifier 72 and the primary winding 73 of a transformer 74. The secondary winding 75 of this transformer is connected to the control grid 76 of a gaseous conduction tube 77, which is normally non-conductive and the anode 78 of which is supplied with positive potential through the winding 79 of a corrector magnet. Associated with the corrector tube 77 is a normally conducting tube 81, also of the gaseous conduction type, the connections for which and the functioning of which are described in Letters Patent No. 2,053,016 granted to Harold F. Wilder on Sept. 1, 1936. The secondary winding 75 of the transformer 74 is normally short circuited by rings 82 and 83 of the receiving distributor. Periodically, as the brushes engage either segment 84 or 85 of the ring 82, this short circuit is removed.

The following description outlines the operation of a signalling system in accordance with the present invention. The three elements of the usual cable code are a dot, usually transmitted by applying one polarity of a potential to the cable, a dash, sent by applying the opposite polarity of potential, and a space, usually accomplished by grounding the cable. Since the method of superimposing a carrier frequency on a conductor also carrying direct current signals is commonly known, it can be assumed for the purposes of this description that the direct current transmitter is idle, in which condition a ground is applied to the cable. Therefore, in the present system, it may be said that the space element is transmitted on the carrier frequency channel by applying ground to the cable, or in other words, no alternating current is transmitted. For a dot, the tongue of relay 32 is operated to the right, thereby applying negative potential to the segments 34 and 35 of ring 30. Similarly, for a dash, the tongue of relay 33 is operated to the right and positive potential is applied to the segments 34 and 35. For a space, the tongues of both relays 32 and 33 remain on their left hand contacts and no battery is applied to the segments 34 and 35.

It will be noted that each of the control relays is provided with a biasing winding 86 which is constantly energized, whereby the relay tongues are normally held against their left hand contacts. These relays are also provided with operating windings 87 which, if suitably energized, are capable of overcoming the effects of the biasing windings and cause the tongues to move to their right hand contacts. The windings 87 of relays 23 and 24 are oppositely poled so that, except for the transmission of a space signal, the tongues 88 and 89 respectively are oppositely positioned. Similar connections are also provided for the windings 87 of the relays 37 and 38. The windings 87 of relays 17 and 18 are poled alike so that the tongues 15 and 16 respectively are always correspondingly positioned.

The transmitting distributor brushes 91 and 92 traverse their respective rings synchronously. Thus when the brush 91 is engaged with the idle segment 93, the local brush 92 is engaged with the operating segment 34. Assume that a dot is to be transmitted. The tongue 94 of the dot relay 32 will be on its right hand contact, and negative potential will be applied to the operating windings 87 of the control relays through the left contact and tongue 95 of the dash relay 33, segment 34, brush 92 and the solid ring 31. The control relay tongues 88, 15, 16 and 96 are moved to their right hand contacts and all others remain on their left hand contacts. Negative potential is applied to the locking segments 36 of ring 30 through the right contact and tongue 96 of the control relay 37, and the left contact and tongue 97 of control relay 38. The effect of this is to maintain negative potential on the operating windings 87 of all control relays after the brush 92 has passed beyond segment 34. Also positive potential is applied to the bus bar 13 and negative potential to bus bar 14 by the engagement of tongues 15 and 16 of relays 17 and 18 respectively with their right hand contacts. The terminal of the primary winding 21 of transformer 22 remote from the solid ring 12 is connected to ground through the tongue 89 and left hand contact of the control relay 24 and the tongue 88 and right hand contact of control relay 23, so that as the brush 91 moves onto segment 98 and succeeding ones in that group the primary of the transformer will be energized.

Between the bus bars 13 and 14 and the fifth and sixth segments of the group are direct connections 99 and 101. However, between the bus bars and the fourth and seventh segments are small adjustable resistances 102. Also between the bus bars and the third, second and first, and the eighth, ninth and tenth segments are similar adjustable current limiting resistances but gradually increasing in value, so that as the brush 91 traverses the ten commutator segments, the train of alternating current impulses starts at a small amplitude, increases gradually to a maximum and then decreases to a small amplitude, finally becoming zero as the brush engages the idle segment 103.

A representation of such a series of alternating current impulses is shown by the square top waves 104 in Fig. 2. That portion included between the points 105 and 106 represents the signals sent into the filter 19 as the brush 91 travels over segments 93 to 103 for the transmission of a dot. Modulating the carrier frequency alternations in this manner aids in signal shaping and also helps to reduce to a practical minimum any interference which would be caused by connecting to and disconnecting from the cable an alternating current of constant maximum amplitude. The filter 19 serves to eliminate the higher harmonic frequencies normally present in the square top wave as it comes from the commutator. Thus the alternating current which is impressed upon the cable 29 by the secondary winding 25 of the transformer 22 is graphically represented by the dotted line 107 of Fig. 2. Because of the presence of the transformer 22 there is a one hundred and eight electrical degree phase difference between the commutator signals and the line signals. It will be noted that between the points 105 and 106 odd numbered half cycles of the line signals are of negative polarity and even numbered half cycles are of positive polarity.

Again referring to Fig. 1, suppose that when the brushes 91 and 92 are on their respective segments 103 and 35 after the transmission of a dot, the next code signal to be sent is a dash. At this time, or any time previous while the brush 92 is traversing the first locking segment 36, the tongue 94 of the dot relay 32 is moved to its left hand contact and the tongue 95 of the dash relay 33 is moved to its right hand contact. Thus, positive potential is connected to the operating windings 87 of the control relays. This time the tongues 89 and 97 are moved to their right hand contacts. It will be seen that positive potential is applied to the locking segment so that the control relay tongues will remain in these positions for the duration of the dash transmission. Also a ground is applied to the primary winding 21 of the transformer 22 through the tongue 89 and right hand contact of the control relay 24. Bus bar 13 now is at a negative potential and bus bar 14 at a positive potential. The traverse of the brush 91 over the second group of commutator segments included between segments 103 and 108 results in the transmission of a series of alternating current impulses similar to the previous series except for a phase difference of one hundred and eighty electrical degrees.

This second series is represented in Fig. 2 by the lines 104 and 107 between points 106 and 109. The phase difference between the first and second series of alternations results in the odd numbered half cycles of line signals of the second series being of positive polarity and the even numbered half cycles being of negative polarity.

The transmission of the space element of the cable code is accomplished by positioning the tongues 94 and 95 of the code relays 32 and 33 respectively of Fig. 1 on their left hand contacts. In these positions there is no potential connected to the operating segments 34 and 35 of the ring 30. Hence, when the brush 92 reaches one of these segments, the operating windings 87 of the control relays are de-energized and the tongues of these relays are moved to their left contacts under the influence of the biasing windings 86. Thus, the battery is removed from the locking segments 36 and the circuit of the transformer primary winding 21 is opened at the contacts of the control relays 23 and 24, whereby there is no alternating current impressed upon the cable 29.

Between the extremities 111 and 112 of the duplex bridge is connected apparatus 113 for receiving signals from the other terminal of the cable. The receiving apparatus 113 is connected with one terminal of its input circuit to the cable 29 and the other terminal to the artificial line 114.

Fig. 3 illustrates receiving apparatus, similar to that indicated at 113 in Fig. 1, located at the other terminal of the cable for receiving the signals sent from the commutators 11 and 12 of Fig. 1. A suitable wave filter and amplifier 39 is connected with its input terminals to the cable and artificial line. The receiving distributor comprising four pairs of rings is operated synchronously with the incoming alternating current signals in a manner which will be described in subsequent paragraphs. Periodically the control grids 58 and 59 of the signal receiving tubes 45 and 46 respectively are connected to the terminals 115 and 116 respectively of the output resistance 40 by means of the engagement of brushes 117 and 118 with the segments 119 and 121 of their respective rings 54 and 56. It should be noted that the time at which these connections are made coincides with the time at which the central portion of the fifth half cycle of alternating current line signal is being received. Hence, when the brushes 117 and 118 are engaged with the segments of their respective rings to receive the dot element of the cable code, the points 116 and 115 of the output resistance 40 are negative and positive respectively with reference to the tube cathodes 43 and 44, since a negative potential appears on the cable at this instant. The connection of the negative potential of the point 116 to the grid 59 of tube 46 has no effect. But the positive potential of the point 115 which is applied to the grid 58 of the tube 45 initiates conduction in that tube. Positive anode potential for the tube 45 is supplied from the distributor rings 52 and 53, through windings of the repeating relays 49 and 51. The polarities of the windings 123 and 124 are such that the tongue 125 of the dot relay 49 is moved to its right hand contact, and the tongue 126 of the dash relay 51 is held on its left hand contact. As described hereinbefore, the tongues of the code relays 32 and 33 of Fig. 1 were in similar positions when the transmission of the dot element was initiated. Hence, the tongues of the repeating relays 49 and 51 are in position to repeat the dot element to a suitable recording device, or to another section of cable, either through carrier transmitting apparatus or directly in the form of direct current signals.

The tube 45 remains conducting and the windings 123 and 124 of the relays 49 and 51 remain energized until the brush 127 reaches segment 128 of ring 52 when the positive potential of ring 53 is removed from the anode 47 of the tube 45. The tube is thus returned to its normal non-conducting state and the windings 123 and 124 are deenergized but the tongues 125 and 126 remain in position. The brush 127 leaves the segment 128 and the anode potential for the tubes 45 and 36 is restored just prior to the engagement of the brushes 117 and 118 with their respective segments 129 and 131.

The time at which this latter connection is made is when the fifth half cycle of the alternating current line signal representing a dash element is being received by the network 39. Reference to Fig. 2 discloses that the cable is at a positive potential at this instant. Hence the terminals 116 and 115 of the output resistance 40 are respectively positive and negative with reference to the tube cathodes 43 and 44. This condition initiates conduction in tube 46 but not in tube 45 and also energizes the windings 132 and 133 of the repeating relays 49 and 51, thereby positioning the tongue 125 on its left hand contact and the tongue 126 on its right hand contact.

While the space element of the signal is being received there is no alternating current being transmitted over the cable. Hence when the control grids 58 and 59 are connected to the points 115 and 116 respectively of the output resistance 40, both are rendered positive with respect to their cathodes 43 and 44 by the biasing battery 42. Both of the tubes 45 and 46 start conducting current, thereby energizing all of the windings of the repeating relays 49 and 51. But the windings 123 and 133, which tend to position their respective tongues on their right hand contacts, are shunted by resistances 134 and 135 respectively. Thus, the magnetic effect that these windings have on the tongues 125 and 126 is overcome by the effect of the windings 132 and 124, and the tongues are moved to their left hand contacts. In these positions a ground condition is applied to the recording device or to the succeeding cable section.

The remainder of this description has reference to maintaining synchronism between the sending and receiving distributors. The reversals of the line current produce discharges in the tubes 60 and 61 alternately, in the manner of the well known parallel type inverter. As a result the condenser 71 is alternately charged to one potential and then to a potential of the opposite polarity. The full wave rectifier 72 in series with this condenser is instrumental in supplying a series of unidirectional impulses to the primary winding 73 of the transformer 74. Hence, potentials are induced in the secondary winding 75 of such polarity that the point 136 is positive with respect to the point 137. But the secondary winding is normally short circuited by the engagement of the distributor brush 138 with the solid ring 82 and any of the longer segments of the ring 82. Consequently, the tube 77 remains inactive and the discharge of the tube 81 continues as previously described. These conditions prevail as long as the sending and receiving distributors remain in synchronism.

It has been stated hereinbefore that the brushes of the receiving distributor are normally operated at a slightly greater speed than those of the sending distributor. Consequently, when the brush 138 reaches a point which is slightly in advance of the synchronous position so that it is engaged with either segment 84 or 85 at the time of the reversal of the line current 107 occurring between the fourth and fifth half cycle of any group of carrier signals, the short circuit is removed from the secondary winding 75 of the transformer 74. The impulse that is induced in the secondary winding by the line current reversal is thus allowed to apply a positive potential to the grid 76 of the tube 77 thereby initiating conduction therein and energizing the winding 79 of the corrector magnet. The operation of the corrector retards the brush 138 and all others of the receiving distributor sufficiently to reestablish synchronism between the sending and receiving mechanism.

The discharge of the tube 77 is maintained for a predetermined time as described in detail in the aforementioned Wilder patent. Briefly, when the discharge is initiated in the tube 77, the arc in tube 81 is extinguished because of the commutating action of the condenser 139. Once this arc is extinguished, the positive electrostatic charge applied to the grid 141 by the timing condenser 142 is insufficient to again render the tube 81 conducting. But the positive potential which is applied to the anode 143 is now materially greater than when the tube was conductive. Hence, the condenser begins to accumulate a charge of a higher positive potential, the rate of charge being determined by the value of the timing resistance 144. Eventually the potential applied to the grid 141 is sufficiently positive to initiate conduction again in the tube 81 thereby extinguishing the arc in tube 77 and deenergizing the winding 79 of the corrector magnet.

The speeds of the sending and receiving distributors are matched closely enough so that the reversal of the line current between the fourth and fifth half cycles of a group of alternations does not occur later than the engagement of the brush 138 with either of the segments 84 or 85. Also, during times when no intelligence is being transmitted, groups of alternating current pulsations are periodically sent over the cable for the purpose of providing corrective impulses and thereby maintaining synchronism between the transmitting and receiving systems.

It is obvious that the carrier current system herein disclosed may also be adapted for use with two element signals, wherein one element is represented by a series of oscillations and the other element is represented by an absence of oscillations.

Although the invention has been shown and described herein with particular reference to a multiplex telegraph system, it will be appreciated that it may have equal utility in a start-stop system. In that case, any well known latching means should be provided to start the sending and receiving distributors at the same time. Also, since there is no necessity for maintaining constant synchronism, the correcting apparatus may be omitted from the receiving system.

It should be understood that a number of such systems, each employing a different frequency, may be superimposed on a submarine cable or other signalling circuit carrying a regular direct current transmission channel, and may be operated simultaneously and independently.

It is obvious, of course, that the novel attributes of the invention may be embodied in various other forms without departing from the spirit of the invention. Therefore, it is desired that the invention be not limited to the exact details shown and described but that it be defined by the scope of the appended claims.

What is claimed is:

1. A carrier current telegraph system, embodying a line circuit, a source of signals, each signal comprising a plurality of current oscillations, means for impressing said signals upon said line circuit and for displacing the phase relation of said signals with respect to said source in accordance with a prearranged code, a receiving apparatus comprising means responsive to polarized impulses for receiving and repeating said signals, a device for selecting a predetermined half cycle from each group of the received oscillations to constitute one of said impulses, the polarity of said impulses being indicative of said signals, and means responsive only to asynchronously received oscillations and serving to re-establish synchronism between said device and said received oscillations.

2. A carrier current telegraph system, embodying a line circuit, a source of signals, said source comprising a distributor of current oscillations, each signal comprising a group of said oscillations, control relays for completing a circuit between said distributor and said line circuit and for displacing the phase relation of said oscillations with respect to said distributor in accordance with a prearranged code, a receiving apparatus characterized by a pair of gaseous conduction tubes adapted to receive and repeat said signals, a receiving distributor for completing circuits between said tubes and said line circuit during the reception of predetermined half cycles of said oscillations and for timing the conduction period of said tubes, and a correcting device comprising a gaseous conduction tube for maintaining synchronism between said receiving distributor and said received oscillations, said last mentioned tube being responsive to asynchronously received oscillations.

3. In a carrier current telegraph system, a line circuit, a transmitting apparatus comprising a generator of groups of a variable number of current oscillations each of said groups representing a signal element, means for impressing said groups of oscillations upon said circuit, and means for displacing the phase of said groups with respect to said generator, both of said means being responsive to signals according to a prearranged code and operative in timed relation with said generator.

4. In a carrier current telegraph system, a transmitting apparatus comprising an alternating current commutator, a relay bank responsive to signals in accordance with a prearranged three element code, said relay bank serving to complete a circuit through said commutator and to alter the phase relationship between the alternating current and said commutator in accordance with the identity of the code element, and means synchronous with said commutator for timing the operation of said relay bank.

5. In a carrier current telegraph system, a transmitting apparatus comprising a commutator to generate groups of alternating current impulses each of said groups representing a signal element, current limiting means serving to modulate said impulses in a predetermined and invariable manner, and means to complete a circuit through said commutator and to produce a one hundred and eighty electrical degree phase difference between said groups of impulses in accordance with a prearranged code.

6. In a carrier current telegraph system, a line circuit, a source of signals, said signals comprising combinations of three different line conditions, a receiving apparatus for said signals comprising means responsive to one of said line conditions, additional means responsive to another of said line conditions, both of said means being responsive to the third of said line conditions, and a synchronous distributor for periodically subjecting both of said means simultaneously to the influence of said line conditions.

7. In a carrier current telegraph system, a source of signals, said signals comprising a state of oscillation in phase with said source, another state of oscillation one hundred and eighty electrical degrees out of phase with said source, and a non-oscillating state, a receiving apparatus for said signals comprising means responsive to said in-phase oscillation state, and additional means responsive to said out-of-phase oscillation state, both of said means being responsive to said non-oscillating state.

8. In a carrier current telegraph system, a source of signals, said signals comprising two types of groups of current oscillations, one of said types being displaced from the other by one hundred and eighty electrical degrees, a receiving apparatus comprising an amplifier having an output circuit, a pair of trigger devices adapted to be started into operation upon their momentary connection to said output circuit, and a distributor in synchronism with said groups of oscillations, said distributor serving to establish said connections at a definite time during the reception of each of said groups of oscillations.

9. In a carrier current telegraph system, a source of signals, said signals comprising two types of groups of current oscillations, one of said types having the odd numbered half cycles of positive polarity and the other of said types having the odd numbered half cycles of negative polarity, a receiving apparatus comprising a pair of gaseous conduction tubes having control circuits, one of said tubes being responsive to positive half cycles and the other of said tubes being responsive to negative half cycles, and means synchronous with said received oscillations for impressing a predetermined half cycle of said oscillations upon said control circuits.

10. In a carrier current telegraph system, a source of signals, said signals comprising groups of current oscillations, a receiving apparatus comprising a pair of gaseous conduction tubes having control electrodes, and means for periodically impressing a predetermined half cycle of any of said groups of oscillations upon said control electrodes to initiate a discharge through either one or the other of said tubes.

11. In a carrier current telegraph system, a source of signals, each signal comprising a plurality of current oscillations, a receiving apparatus for said signals, and a phase correcting device responsive to a predetermined half cycle of one of said signals only when said receiving apparatus and said signals are asynchronous, said device serving to re-establish synchronism between said signals and said receiving apparatus.

12. In a carrier current telegraph system, a source of signals, said signals comprising current oscillations, a receiving apparatus for said signals, means for maintaining said receiving apparatus in synchronism with said signals, said means comprising a gaseous conduction relay having input and output circuits, means periodically responsive to one of said oscillations when said oscillations are asynchronous with said receiving apparatus for applying a starting condition to said input circuit, and a corrective device connected in said output circuit serving to reposition said receiving apparatus in synchronism with said oscillations.

13. In a carrier current telegraph system, a source of signals, each signal comprising a plurality of current oscillations, a receiving apparatus for said signals, a gaseous conduction tube adapted to be started into operation by an electrostatic condition, a receiving distributor normally rotating at a slightly greater speed than said received signals, said distributor embodying segments for applying said electrostatic condition when said distributor precedes a predetermined half cycle of each of said received signals in time by a predetermined amount, and a retarding device controlled by said tube to reposition said distributor in phase with said signals.

14. In a carrier current telegraph system, a source of signals, each signal comprising a plurality of current oscillations, a receiving apparatus for said signals, a gaseous conduction tube adapted to be started into operation by a unidirectional impulse generated by a predetermined half cycle of each of said signals when an asynchronous condition exists between said receiving apparatus and said signals, correcting means controlled by said tube to reestablish synchronism, and timing means in circuit with said tube for the extinction thereof after the lapse of a predetermined time.

15. In a carrier current telegraph system, a source of signals, said signals comprising current oscillations, a receiving apparatus for said signals, means for maintaining said receiving apparatus in synchronism with said signals, said means comprising a rectifier for converting said oscillations into unidirectional impulses, a gaseous conduction tube having input and output circuits, means operative periodically when an asynchronous condition exists between said receiving apparatus and said signals, said means serving to impress one of said impulses upon said input circuit and thereby start conduction in said tube, and corrective means included in said output circuit to reestablish synchronism.

16. In a carrier current telegraph system, a source of signals, said signals comprising groups of a variable number of current oscillations and a neutral condition in accordance with a prearranged code, said groups having corresponding half cycles of either positive or negative polarity, a receiving apparatus for said signals, said apparatus being characterized by a pair of relays, one responsive to a positive half cycle, the other responsive to a negative half cycle of said received oscillations, and both being responsive to said neutral condition, synchronous means for impressing a definite half cycle of said oscillations upon said relays, and means responsive to said received oscillations for confirming a synchronous condition or for correcting an asynchronous condition.

HAKON H. HAGLUND.